(12) United States Patent
Kim et al.

(10) Patent No.: US 8,995,752 B2
(45) Date of Patent: Mar. 31, 2015

(54) SYSTEM FOR MAKING 3D CONTENTS PROVIDED WITH VISUAL FATIGUE MINIMIZATION AND METHOD OF THE SAME

(75) Inventors: Hae Dong Kim, Daejeon (KR); Jung Jae Yu, Gyeonggi-do (KR); Myung Ha Kim, Daejeon (KR); Ho Wook Jang, Daejeon (KR); Hye Sun Kim, Daejeon (KR); Yun Ji Ban, Daejeon (KR); Seung Woo Nam, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 365 days.

(21) Appl. No.: 13/313,355

(22) Filed: Dec. 7, 2011

(65) Prior Publication Data

US 2012/0148146 A1    Jun. 14, 2012

(30) Foreign Application Priority Data

Dec. 9, 2010  (KR) .................. 10-2010-0125840

(51) Int. Cl.
*G06K 9/00* (2006.01)
*H04N 13/00* (2006.01)
*H04N 13/02* (2006.01)

(52) U.S. Cl.
CPC ....... *H04N 13/0033* (2013.01); *H04N 13/0296* (2013.01)
USPC .......................................... 382/154; 382/285

(58) Field of Classification Search
CPC .................. G06K 2209/40; G06K 2209/401; G06K 2209/403; G06K 9/00214; G06K 9/00208; G06T 15/00; G06T 17/00; G06T 19/00; G06T 19/20; G06T 2200/04; G06T 2200/08; G06T 7/0077; G06T 7/0075; G06T 2207/10012
USPC .................................................. 382/154, 285
See application file for complete search history.

(56) References Cited

U.S. PATENT DOCUMENTS

| | | | |
|---|---|---|---|
| 5,519,533 A * | 5/1996 | Nomura et al. ................ 359/478 |
| 6,996,267 B2 | 2/2006 | Tabata |
| 7,224,834 B2 * | 5/2007 | Nambu .......................... 382/181 |
| 8,390,674 B2 * | 3/2013 | Kim et al. ....................... 348/42 |
| 2002/0015527 A1 * | 2/2002 | Nambu .......................... 382/218 |
| 2002/0114508 A1 * | 8/2002 | Love ............................. 382/154 |
| 2009/0142041 A1 | 6/2009 | Nagasawa et al. |
| 2012/0038641 A1 * | 2/2012 | Levantovsky ................. 345/424 |

FOREIGN PATENT DOCUMENTS

KR    10-2007-0071927    7/2007

* cited by examiner

*Primary Examiner* — Brian Le
(74) *Attorney, Agent, or Firm* — Staas & Halsey LLP

(57) ABSTRACT

Disclosed are a system for making 3D contents provided with visual fatigue minimization and a method of the same. More particularly, an exemplary embodiment of the present invention provides a system for making 3D contents including: a human factor information unit generating guide information for making 3D contents by considering factors causing visual fatigue of the 3D contents; and a 3D contents making unit applying guide information generated by the human factor information unit to 3D contents data inputted for making the 3D contents to make the 3D contents, and a method of making 3D contents.

12 Claims, 5 Drawing Sheets

SYSTEM FOR MAKING 3D CONTENTS PROVIDED WITH VISUAL FATIGUE MINIMIZATION AND METHOD OF THE SAME

CROSS-REFERENCE TO RELATED APPLICATIONS

This application claims priority to and the benefit of Korean Patent Application No. 10-2010-0125840 filed in the Korean Intellectual Property Office on Dec. 9, 2010, the entire contents of which are incorporated herein by reference.

BACKGROUND OF THE INVENTION

1. Field of the Invention

The present invention relates to a system for making 3D contents provided with visual fatigue minimization and a method of the same. More particularly, the present invention relates to a system for making 3D contents that configures human factor information and provides the configured human factor information as guide information at the time of making the 3D contents in order to minimize visual fatigue caused at the time of making the 3D contents, and a method of the same.

2. Description of the Related Art

Generally, in the related art, 3D contents are acquired by photographing which a stereographer or a photographer who has a lot of experiences in photographing 3D contents performs at the time of making 3D contents and the acquired 3D contents are corrected and edited by visual judgment and experiences of a contents maker, and as a result, there is a risk that 3D contents causing visual fatigue are made and since there is no criterion for minimizing visual fatigue by 3D contents, 3D contents should be made by relying on the experiences.

In the related art, even though the amount of errors between images has been attempted to be reduced by considering visual fatigue from the process of acquiring the 3D contents, there are many cases in which an error level of an image cannot be judged by visual checking, and as a result, there are many cases in which the 3D contents are acquired while minimum error control required for contents has not been made. In addition, photographing should be performed while controlling visual fatigue factors by considering an outputted environment or contents configurations, but detailed information therefor is not provided, and as a result, there are many cases in which 3D contents are acquired or an edited and synthesized final image is made based on wrong experiences. Therefore, a lot of people may feel dizzy at the time of viewing the 3D contents and in this case, when a 3D expression level is reduced in order to compensate for dizziness, i.e., reduce dizziness, a 3D effect disappears, such that the people may not feel the difference between an image on the existing screen having perspective and a stereoscopic 3D image.

Accordingly, in order to minimize visual fatigue while excellently expressing the stereoscopic 3D image, there is on the rise a necessity that the 3D contents should be made while minimizing a cause of visual fatigue by using information regarding factors causing visual fatigue while acquiring, editing, and synthesizing the 3D contents.

SUMMARY OF THE INVENTION

The present invention has been made in an effort to provide a method and a system of making 3D contents provided with visual fatigue minimization by extracting visual fatigue factors and influential relationships thereof through testing a visual fatigue phenomenon generated in the 3D contents, constructing the extracted visual fatigue factors and influential relationships as quantitative data, and providing the constructed quantitative data as a guide at the time of making the 3D contents in order to make high-quality 3D contents provided with visual fatigue minimization.

Other objects and advantages of the present invention will be described below and more clearly provided by exemplary embodiments of the present invention. However, the object of the present invention is not limited to the above description and undescribed other objects will be able to be clearly appreciated to those skilled in the art from the following description.

An exemplary embodiment of the present invention provides a system for making 3D contents provided with visual fatigue minimization which tests complex factors causing visual fatigue in the 3D contents by separating the complex factors into independent factors to construct correlations of the factors as data, thereby providing the data to the 3D content making system as a guide.

That is, the system includes a human factor information unit 10 factorizing visual fatigue factors of the 3D contents and quantifying the complex correlations of the factors and a 3D content making unit 20 making the 3D contents by guide information according to a current making situation on the basis of information of the human factor information unit.

Further, the present invention is characterized in suggesting a method of providing a guide for minimizing visual fatigue with respect to both an effect of modification of a predetermined factor or correlation of the relevant effect including data for each independent factor and complex factor of human factors and correlations thereof and suggesting a method of making the 3D contents to be adaptive to a situation and minimize accumulated visual fatigue by providing a guide capable of minimizing presentation not following the suggested guide information in the next expression.

According to exemplary embodiments of the present invention, in the related art, as an induction limit of visual fatigue could not be known and 3D contents were made by relying on 3D contents maker's experiences, it was difficult to express 3D contents and making the 3D contents while consuming a lot of trial and errors and costs is utilized as a guide based on data acquired by quantifying a human factor component based on a test or the existing data to adaptively cope with an image making environment, such that the 3D contents provided with visual fatigue minimization can be more easily and quickly made.

Further, a human factor guide unit according to exemplary embodiment of the present invention can be modified and improved according to user's requirement and as data is added, a guide having high reliability can be provided, thereby conveniently making the 3D contents.

In recent years, as requirements for a stereoscopic 3D image are increased in order to acquire more reality in a move or a game, a music video, an advertisement, and the like, a 3D contents making system that guides to minimize a visual fatigue phenomenon is developed to help making more 3D image contents by solving a problem in making the 3D contents.

Accordingly, the 3D contents provided with visual fatigue minimization, which are made according to the exemplary embodiments of the present invention, are expected to be used in various fields such as virtual reality, augmented reality, scientific visualization, and the like.

DETAILED DESCRIPTION OF THE EMBODIMENTS

Figure 1:
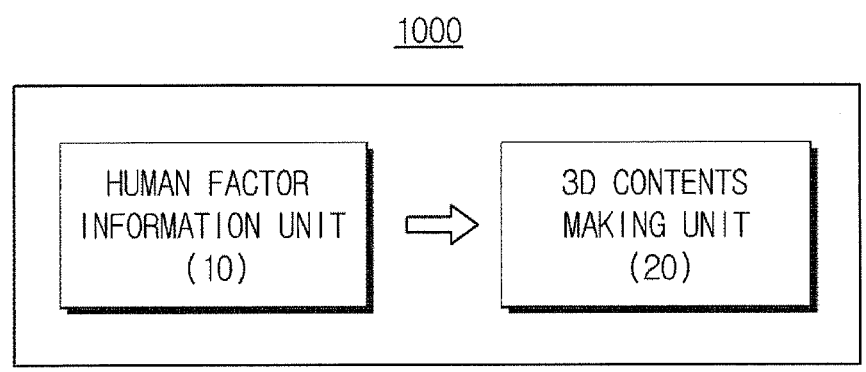
FIG. 1 is a schematic block diagram of a 3D contents making system according to an exemplary embodiment of the present invention.

Hereinafter, exemplary embodiments of the present invention will be described in detail with reference to the accompanying drawings. In this description, when any one element is connected to another element, the corresponding element may be connected directly to another element or with a third element interposed therebetween. First of all, it is to be noted that in giving reference numerals to elements of each drawing, like reference numerals refer to like elements even though like elements are shown in different drawings. The components and operations of the present invention illustrated in the drawings and described with reference to the drawings are described as at least one exemplary embodiment and the spirit and the core components and operation of the present invention are not limited thereto.

FIG. 1 is a schematic block diagram of a 3D contents making system according to an exemplary embodiment of the present invention.

As shown in FIG. 1, the 3D contents making system 1000 according to the exemplary embodiment of the present invention includes a human factor information unit 10 and a 3D contents making unit 20. The configuration of each unit will be described.

The human factor information unit 10 generates guide information for making 3D contents by considering factors causing visual fatigue of the 3D contents. That is, by constructing data acquired by quantifying the relation with the visual fatigue or a weight value with independent factors causing the visual fatigue of the 3D contents and complex factors constituted by combinations thereof, the correlations thereof, the correlations with reality, and the like, when the 3D contents are made in the 3D contents making unit 20 that will be described later, the guide information is provided so as to minimize the visual fatigue.

The 3D contents making unit 20 applies guide information generated by the human factor information unit 10 to 3D contents data inputted for making the 3D contents to make the 3D contents. That is, the 3D contents making unit 20 makes an image capable of minimizing visual fatigue by suggesting a guide direction to minimize the visual fatigue by using data regarding a current situation or data quantified according to a predetermined condition input and suggesting a guide modified according to the determined result value.

Hereinafter, the human factor information unit 10 and the 3D contents making unit 20 shown in FIG. 1 will be described in more detail.

Figure 2:
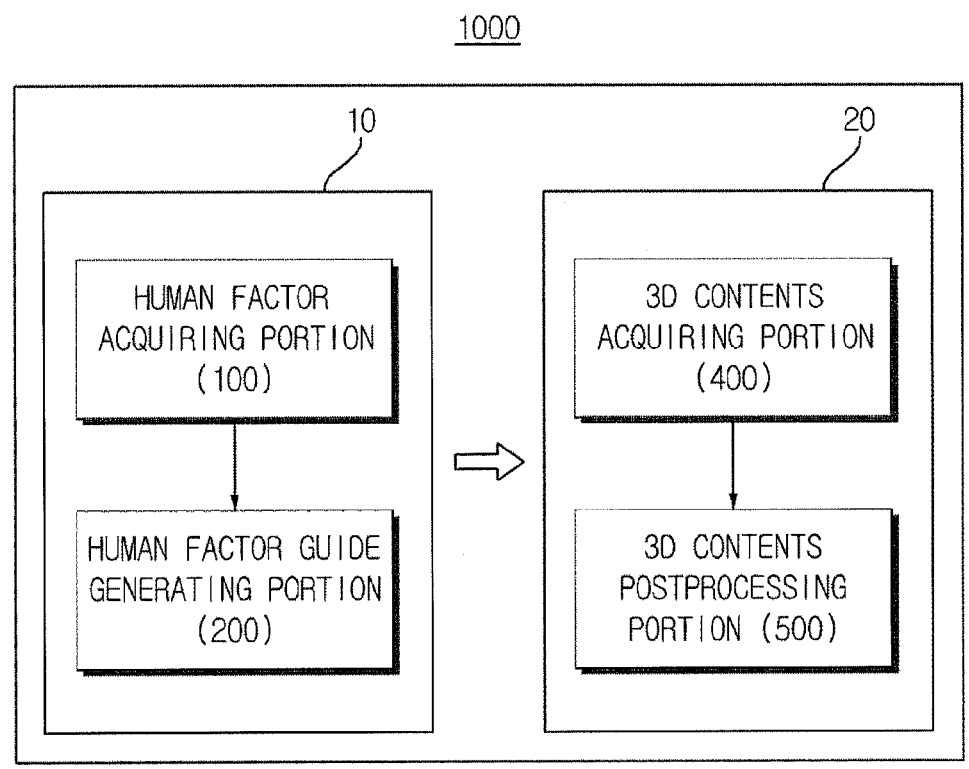
FIG. 2 is a block diagram for more specifically describing the 3D contents making system shown in FIG. 1.
Figure 3:
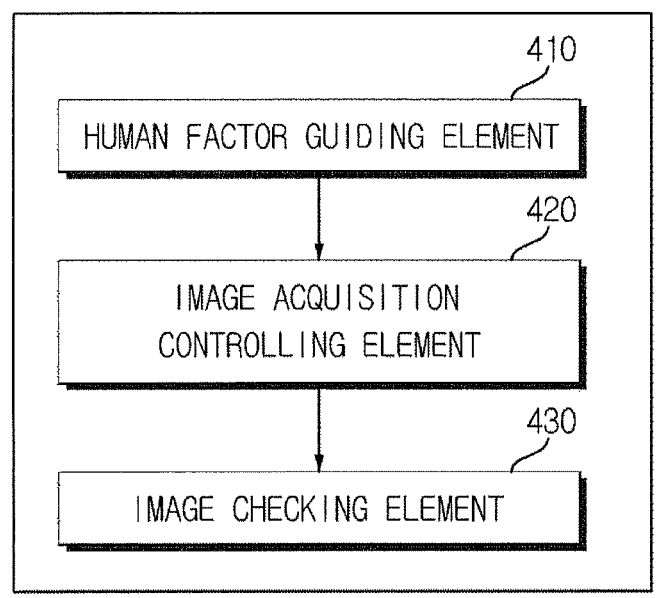
FIG. 3 is a block diagram for describing a 3D contents acquiring unit shown in FIG. 2.
Figure 4:
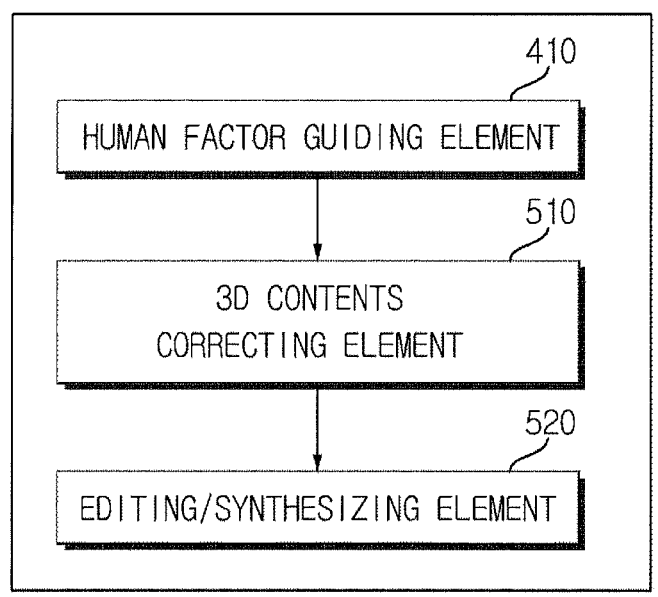
FIG. 4 is a block diagram for describing a 3D contents postprocessing unit shown in FIG. 2.

FIG. 2 is a block diagram for more specifically describing the 3D contents making system shown in FIG. 1, FIG. 3 is a block diagram for describing a 3D contents acquiring unit shown in FIG. 2, and FIG. 4 is a block diagram for describing a 3D contents postprocessing unit shown in FIG. 2.

As shown in FIG. 2, the human factor information unit 10 includes a human factor acquiring portion 100 and a human factor guide generating portion 200 and the 3D contents making unit 20 includes a 3D contents acquiring portion 400 and a 3D postprocessing portion 500.

First, the human factor acquiring portion 100 and the human factor guide generating portion 200 of the human factor information unit 10 will be described.

The human factor acquiring portion 100 quantifies relations of independent factors causing the visual fatigue of the 3D contents and complex factors constituted by the combinations of the independent factors with actual visual fatigue and constructs the quantified relations as data. Herein, the data of the human factor acquiring portion 100 is configured based on the data acquired by quantifying the human factors through a test or the existing result for each factor. That is, as the quantified factors, data for each independent factor, correlation data for each complex factor, data for each complex factor, verification data for the complex factor, reality application data, and reality correlation verification data are considered.

The data for each independent factor represent factors well known at the time of making the 3D contents and examples thereof may include a vertical error, a horizontal error, and a rotation error between left and right images. As one example of a good test for acquiring the quantified data associated with an influence for each independent factor, the test is performed by using image data made by a computer. The correlation data for each complex factor is acquired by quantifying the correlations among the independent factors constituted by analyzing data for each complex factor. The data for each complex factor is constituted by diversified combinations of errors for each independent factor. Examples of the data for each complex data may include keystone distortion image data generated when the layout of two cameras is acquired in a convergence mode (alternatively, a toe-in mode), a lens distortion image data by optical characteristics of a lens, and the like. The complex factor verification data represent a reliability level of suggested data and are used as a probabilistical weight factor of used data. An example of the complex factor verification data may include the level of confidence and a confidence interval of the test result in the case of the test. The reality application data represent data configured based on a real image. An example of the reality application data may include data in which the real image is linearized by previously extracting camera parameters. The reality correlation verification data represent the level of confidence of the reality application data and are used as the probabilistical weight factor of data like the complex factor verification data. As an example of the configuration of the reality correlation verification data, the correlations between the existing data for each independent factor and data for each complex factor and the reality application data are probabilistically calculated to be used for processing the real image.

The human factor guide generating portion 200 applies a predetermined guide information generation condition to the data constituted by the human factor acquiring portion 100 to generate the guide information. That is, the human factor guide generating portion 200 suggests a method capable of minimizing the visual fatigue according to a predetermined condition or a production situation. The human factor information unit 10 associated with the human factor may have accumulated information through the human factor guide generating portion 200 and the accumulated information enables the 3D contents to be made more accurately. Herein, the predetermined guide information generation condition will be described.

The predetermined guide information generation condition is determined by at least any one combination of guide information for each error, viewer guide information, guide information for each symbol, guide information for each image length, guide information for each image feature, and guide information for each environment.

The guide information for each error is the guide information for error factors such as a horizontal/vertical error, a rotation error, a lens distortion error, and a keystone distortion error when two cameras acquire images and output results, which accurately coincide with each other and the viewer guide information is the guide information regarding a difference in 3D contents recognition generated by a binocular distance difference for each age and each of male and female sexes of a viewer who views 3D contents. The guide information for each symbol as a guide for a feature which the viewer prefers represents generation of guide information based on being familiar with a favorite image and a similar image. The guide information for each image length as a guide depending on the length of the image is a guide considering that visual fatigue inducing level and the image length are closely correlated with each other. The guide information for each image feature is a guide classified by features of the images such as an image which is rapidly varied or an image in which an object is frequently moved as the image features. The guide information for each environment is a guide for a screen size in which 3D contents are expressed such as an output environment and adjusting the brightness of the 3D contents depending on a method of viewing the 3D contents such as a polarization mode.

Further, the guide information generated by the human factor guide generating portion 200 includes basic guide information distinguished for each guide factor, complex guide information in which two or more basic guide information are combined, and synthetic guide information applied to synthesis of two or more different images according to the predetermined guide information generation condition and in particular, one example of using the synthetic guide information includes synthesis of a computer graphics (CG) image and a real image.

Next, referring to FIGS. 3 and 4, the 3D contents image acquiring portion 400 and the 3D contents postprocessing portion 500 of the 3D contents making unit 20 will be described.

The 3D contents acquiring portion 400 as the system that acquires 3D contents data such as photographing the 3D contents acquires an image minimizing fatigue induction by considering the guide information to which the human factor is applied so as to acquire the image capable of minimizing the visual fatigue even during acquiring the 3D contents and the 3D contents postprocessing portion 500 enables the 3D contents provided with visual fatigue minimization to be made from previously made or acquired images through image processing. The 3D contents postprocessing portion 500 may process a multi-viewpoint image as well as the 3D contents such as the stereoscopic image as one stereoscopic image with two pairs and process even a single image similarly as stereoscopic image processing when a provided depth map or left and right-eye generation method is applied.

That is, the 3D contents acquiring portion 400 shown in FIG. 3 acquires 3D contents in which the guide information is applied to the 3D contents data received through the 3D contents making unit 20 in order to make the 3D contents and includes a human factor guiding element 410, an image acquisition controlling element 420, and an image checking element 430.

The human factor guiding element 410 provides the guide information generated by the human factor guide generating portion 200 to a current image making environment. The human factor guiding element 410 guides the human factor based on a depth script plan in initial 3D contents making or when a guide environment set-up is initially selected to guide complexly with the factor suggested through the guide information generation condition, guides the human factor based on the selected guide environment set-up. That is, the human factor guiding element 410 gives the guide generation condition to the human factor guide generating portion 200 of the human factor information unit 10 and modifies the acquired result according to the currently selected environment and image making environment to provide a guide.

The image acquisition controlling element 420 controls the 3D contents acquiring means by using the guide information provided from the human factor guiding element 410 in order to acquire the 3D contents data. That is, the image acquisition controlling element 420 acquires the 3D contents through camera placement, lens setting, and the like in order to acquire the image capable of reducing the visual fatigue by using the information of the human factor guiding element 410.

Since the image checking element 430 as the system that checks whether to acquire the 3D contents data may use the known checking system, a detailed description thereof will be omitted herein.

Next, the 3D contents postprocessing portion 500 includes the human factor guiding element 410, a 3D contents correcting element 510, and an editing/synthesizing element 520.

The human factor guiding element 400 guides to minimize the visual fatigue during image postprocessing like the 3D contents acquiring portion 400 and a duplicated description thereof will be omitted.

The 3D contents correcting element 510 matches left and right image environments of the 3D contents acquired by the 3D contents acquiring portion 400 with each other by using the guide information provided from the human factor guiding element 410. That is, the 3D contents correcting element 510 serves to match the left and right image environments of the stereoscopic 3D image and reduces the visual fatigue by using the information of the human factor guiding element 410.

The editing/synthesizing element 520 edits or synthesizes the 3D contents by using the guide information when the 3D contents acquired by the 3D contents acquiring portion 400 are required to be edited or synthesized and in particular, the visual fatigue may be reduced by using the information of the human factor guiding element 410 at the time of synthesizing the CG image and the real image. As another example thereof, since a zero point (a binocular convergence point) minimizes the visual fatigue, creating a subtitle at the zero point by ensuring a subtitle space at the time of processing the subtitle in the 3D contents may also be suggested as a method of reducing the visual fatigue factor.

Hereinafter, a method of making 3D contents according to an exemplary embodiment of the present invention will be described.

Figure 5:
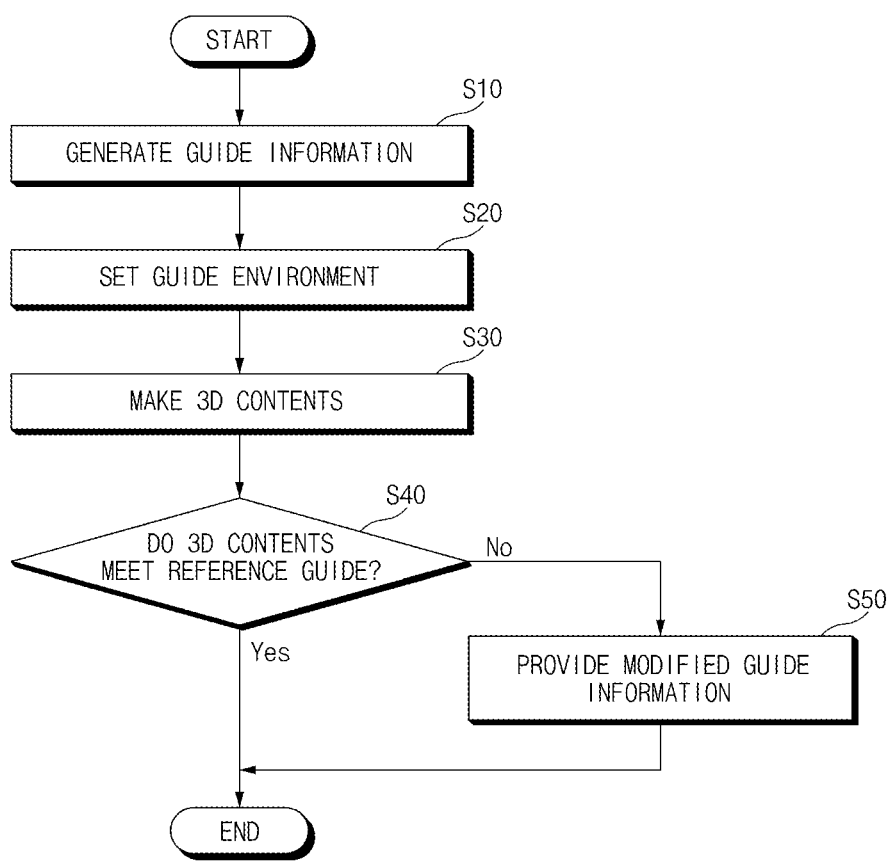
FIG. 5 is a flowchart for describing a method of making 3D contents according to an exemplary embodiment of the present invention.

FIG. 5 is a flowchart for describing a method of making 3D contents according to an exemplary embodiment of the present invention.

As shown in FIG. 5, the 3D contents making method according to the exemplary embodiment of the present invention includes generating guide information (S10), setting a guide environment (S20), making the 3D contents (S30), judging whether the made 3D contents meet a reference guide range (S40), and providing modified guide information with respect to the 3D contents which deviate from the reference guide range in operation S40 (S50). Herein, since a description of operation S10 may be fully appreciated by referring to the 3D contents making system, the description thereof will be omitted.

In operation S20, the setting of the guide environment is to select the property of a currently executed job, in other words, the property is previously selected among general reference information sets of most used jobs. That is, an environment or a making operation to execute the current job is selected and as necessary, prerequisite factor information for executing the current job is inputted.

In operation S30, the making of the 3D contents is similar as the existing method, but different from the existing method in that the reference guide information is provided according to a guide environment set-up. The reference guide information may be provided in various forms such as left and right-eye image difference error, a guide for an image consumer, a symbol guide depending on a feature of the 3D contents, a guide depending on a continuous length of an image, and the like.

In operation S40, it is judged whether the 3D contents made through operation S30 meet the reference guide range. Since this operation is one example in which the 3D contents can be made while minimizing the visual fatigue in spite of providing the guide information, this operation is performed because image making, which deviates from a safety range of the guide according to an intention to making the 3D contents, can be performed.

Further, in operation S50, when it is judged that the 3D contents deviate from the reference guide range, a degree to increase a visual fatigue inducing factor is estimated by using the deviation degree and the modified guide information for modifying the increase of the visual fatigue induction factor is provided. The modified guide information is suggested by considering a difference from a reference guide, and the intensity and continuation time of the visual fatigue induction factor.

The providing of the modified guide information (S50) may be automatically changed according to the image making process and manually changed by a professional user. The 3D contents provided with visual fatigue minimization are made by finally applying the human factor through executing the operations.

As described above, the exemplary embodiments have been described and illustrated in the drawings and the specification. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A system for making 3D contents, comprising:
a human factor information unit generating guide information for making 3D contents by testing complex visual fatigue factors that cause fatigue when viewing 3-D contents, separating the complex visual fatigue factors into independent factors, constructing correlations of the independent factors as data, and considering the factors that cause visual fatigue and the independent factors when making the 3D contents, the guide information comprising a rotation error, a lens distortion error, or a keystone distortion error; and
a 3D contents making unit applying the guide information to 3D contents data to make the 3D contents.

2. The system of claim 1, wherein the human factor information unit includes:
a human factor acquiring portion quantifying relations of the independent factors of the 3D contents that cause the visual fatigue and complex factors constituted by combinations of the independent factors with actual visual fatigue and constructing the quantified relations as data; and
a human factor guide generating portion applying a predetermined guide information generation condition to the data constituted by the human factor acquiring portion to generate the guide information.

3. The system of claim 2, wherein the 3D contents making unit includes:
a 3D contents acquiring portion acquiring 3D contents in which the guide information is applied to the received 3D contents data; and
a 3D contents postprocessing portion performing image-processing of the 3D contents acquired by the 3D contents acquiring portion and the previously acquired image to make the 3D contents.

4. The system of claim 2, wherein the predetermined guide information generation condition is determined by at least any one combination of guide information for each error, viewer guide information, guide information for each symbol, guide information for each image length, guide information for each image feature, and guide information for each environment.

5. The system of claim 4, wherein the human factor guide generating portion includes basic guide information distinguished for each guide factor, complex guide information in which two or more basic guide information are combined, and synthetic guide information applied to synthesis of two or more different images according to the predetermined guide information generation condition.

6. The system of claim 2, wherein the data of the human factor acquiring portion is constituted by at least one of data for each independent factor, data for each complex factor, correlation data for each complex factor, verification data for the complex factor, reality application data, and reality correlation verification data.

7. The system of claim 3, wherein the 3D contents acquiring portion includes:
a human factor guiding element providing the guide information generated by the human factor guide generating portion to a current image making environment;
an image acquisition controlling element controlling the 3D contents acquiring means by using the guide information provided from the human factor guiding element in order to acquire the 3D contents data; and
an image checking element checking whether to acquire the 3D contents data.

8. The system of claim 3, wherein the 3D contents postprocessing portion includes:
a human factor guiding element providing the guide information generated by the human factor guide generating portion to a current image making environment;
a 3D contents correcting element matching left and right image environments of the 3D contents acquired by the 3D contents acquiring portion with each other by using the guide information provided from the human factor guiding element; and
an editing/synthesizing element editing or synthesizing the 3D contents by using the guide information when the 3D contents acquired by the 3D contents acquiring portion are required to be edited or synthesized.

9. A method of making 3D contents, comprising:
(a) generating guide information for guiding making the 3D contents by testing complex visual fatigue factors that cause fatigue when viewing 3-D contents, separating the complex visual fatigue factors into independent factors, constructing correlations of the independent factors as data, and considering the factors that cause visual fatigue and the independent factors when making the 3D contents, the guide information comprising a rotation error, a lens distortion error, or a keystone distortion error;
(b) setting a guide environment for making the 3D contents;
(c) making the 3D contents by using reference guide information depending on the set guide environment;
(d) judging whether the 3D contents made in operation (c) meet a reference guide by the reference guide information;
(e) estimating a degree in which the 3D contents increase the visual fatigue when it is judged that the 3D contents deviate from the reference guide in operation (d); and
(f) making the 3D contents by providing modified guide information by considering the estimation value in operation (e).

10. The method of claim 9, wherein the reference guide information is at least one of an error between left and right images of the 3D contents, a guide for a 3D contents consumer, a symbol guide depending on a feature of the 3D contents, and a guide depending on the length of a continuation time of the 3D contents.

11. The method of claim 9, wherein the modified guide information is at least one of a difference from the reference guide, and the intensity and continuation time of the visual fatigue induction factor of the 3D contents.

12. The method of claim 9, wherein the modified guide information is automatically changed or manually changed.

* * * * *